United States Patent
Rodoni (10) Patent No.: US 11,015,949 B2
(45) Date of Patent: *May 25, 2021

(54) SYSTEM HAVING AUTOMATED ROUTE GENERATION AND OPTIMIZATION

(71) Applicant: RUBICON GLOBAL HOLDINGS, LLC, Atlanta, GA (US)

(72) Inventor: Philip Rodoni, Decatur, GA (US)

(73) Assignee: Rubicon Technologies, LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/551,708

(22) Filed: Aug. 26, 2019

(65) Prior Publication Data

US 2019/0383636 A1  Dec. 19, 2019

Related U.S. Application Data

(63) Continuation of application No. 15/796,841, filed on Oct. 29, 2017, now Pat. No. 10,393,537, which is a (Continued)

(51) Int. Cl.
*G01C 21/36* (2006.01)
*G01C 21/34* (2006.01)
(Continued)

(52) U.S. Cl.
CPC ....... *G01C 21/3664* (2013.01); *G01C 21/343* (2013.01); *G01C 21/367* (2013.01);
(Continued)

(58) Field of Classification Search
CPC .............. G01C 21/3664; G01C 21/343; G01C 21/3614; G01C 21/3676; G01C 21/367;
(Continued)

(56) References Cited

U.S. PATENT DOCUMENTS 5,014,206 A   5/1991  Scribner et al.
5,489,898 A   2/1996  Shigekusa et al.
(Continued)

OTHER PUBLICATIONS

PCT /US2017/056542 Written Opinion and International Search Report dated Nov. 16, 2017.

*Primary Examiner* — John T Repsher, III
(74) *Attorney, Agent, or Firm* — Rock IP, PLLC (57) ABSTRACT

A system is disclosed for managing waste services by a service vehicle. The system may have a locating device configured to generate a location signal indicative of a location of the service vehicle, a sensor configured to generate a service signal indicative of a waste service being performed by the service vehicle, an input device, and a processing unit in communication with the locating device, the sensor, and the input device. The processing unit may be configured to make a determination that the service vehicle has made a plurality of service stops based on the location and service signals, and to automatically generate at least one service route including the plurality of service stops. The processing unit may also be configured to display the at least one service route and the plurality of service stops on a map in at least one graphical user interface on the input device.

14 Claims, 5 Drawing Sheets

Related U.S. Application Data continuation of application No. 15/294,398, filed on Oct. 14, 2016, now Pat. No. 9,803,994.

(51) Int. Cl.
| | | |
|---|---|---|
| *G08G 1/00* | (2006.01) | |
| *G06F 3/0486* | (2013.01) | |
| *G06F 3/0482* | (2013.01) | |
| *G06F 3/0484* | (2013.01) | |

(52) U.S. Cl.
CPC ..... *G01C 21/3614* (2013.01); *G01C 21/3676* (2013.01); *G06F 3/0486* (2013.01); *G08G 1/20* (2013.01); *G06F 3/0482* (2013.01); *G06F 3/04845* (2013.01)

(58) Field of Classification Search
CPC ....... G08G 1/20; G06F 3/0486; G06F 3/0482; G06F 3/04845
See application file for complete search history.

(56) References Cited

U.S. PATENT DOCUMENTS

| | | | |
|---|---|---|---|
| 5,837,945 A * | 11/1998 | Cornwell | B65F 3/04 |
| | | | 177/136 |
| 2002/0044084 A1 | 4/2002 | Itoh et al. | |
| 2004/0054453 A1 | 3/2004 | Brynielsson | |
| 2006/0235739 A1 | 10/2006 | Levis et al. | |
| 2007/0088897 A1 | 4/2007 | Wailes et al. | |
| 2008/0077541 A1 | 3/2008 | Scherer et al. | |
| 2011/0238457 A1 | 9/2011 | Mason et al. | |
| 2013/0096815 A1 * | 4/2013 | Mason | G08G 1/20 |
| | | | 701/400 |
| 2013/0184035 A1 * | 7/2013 | Roberts, Sr. | G06Q 10/08 |
| | | | 455/566 |
| 2014/0026088 A1 | 1/2014 | Monte | |
| 2014/0214697 A1 * | 7/2014 | McSweeney | B65F 1/1484 |
| | | | 705/308 |
| 2016/0300297 A1 | 10/2016 | Kekalainen et al. | |

* cited by examiner

SYSTEM HAVING AUTOMATED ROUTE GENERATION AND OPTIMIZATION

This application is a continuation application and claims priority to U.S. patent application Ser. No. 15/796,841 filed Oct. 29, 2017, now U.S. Pat. No. 10,393,537, which is a continuation of U.S. patent application Ser. No. 15/294,398 filed Oct. 14, 2016, now U.S. Pat. No. 9,803,994, the contents of which are expressly incorporated herein by reference.

TECHNICAL FIELD

The present disclosure relates generally to a system for managing waste services and, more particularly, to a system that automatically generates waste management service routes and provides tools for optimizing the routes.

BACKGROUND

Commercial and residential waste service providers typically dispatch service vehicles to customer properties according to a predetermined pickup schedule assigned to each vehicle. The pickup schedule for each service vehicle is often designed to provide waste services (e.g., to empty waste receptacles) within a particular geographical area and at a particular frequency (e.g., once per week). After completion of each waste service (or periodically during completion of the route), the vehicle operator reports the completion to a back office, which updates the operator's pickup schedule and an account record for the customer. Customers that subscribe to these waste services are billed based on the account record. The operator then maneuvers the service vehicle to a next customer location for completion of additional waste services.

In some instances, it may be difficult to manage the pickup schedule for each service vehicle and for a fleet of service vehicles. In particular, the pickup schedule can change frequently and include new customer locations and/or locations having new or different service requirements. In these instances, it can be difficult for the vehicle operator to determine which stops to make, the order of the stops, the timing of the stops, etc. It can also be difficult to find new customer and/or receptacle locations, to determine travel routes to new locations, to manage instructions associated with required services at each location, and to keep track of the completed services. In addition, it can be challenging at a macro level to continuously keep track of changing service routes for all vehicles within the fleet, and to manage fleet resources in an efficient and profitable manner.

The disclosed system is directed to overcoming one or more of the problems set forth above and/or other problems of the prior art.

SUMMARY

In one aspect, the present disclosure is directed to a system for managing waste services by a service vehicle. The system may include a locating device configured to generate a location signal indicative of a location of the service vehicle, a sensor configured to generate a service signal indicative of a waste service being performed by the service vehicle, an input device, and a processing unit in communication with the locating device, the sensor, and the input device. The processing unit may be configured to make a determination that the service vehicle has made a plurality of service stops based on the location and service signals, and to automatically generate at least one service route including the plurality of service stops. The processing unit may also be configured to display the at least one service route and the plurality of service stops on a map in at least one graphical user interface on the input device.

In another aspect, the present disclosure is directed to a method for managing waste services by a service vehicle. The method may include generating a location signal indicative of a location of the service vehicle, generating a service signal indicative of a waste service being performed by the service vehicle, and making a determination that the service vehicle has made a plurality of service stops based on the location and service signals. The method may also include automatically generating at least one service route including the plurality of service stops, and displaying the at least one service route and the plurality of service stops on a map in at least one graphical user interface.

In yet another aspect, the present disclosure is directed to a non-transitory computer readable medium containing computer-executable programming instructions for managing waste services by a plurality of service vehicles. The method may include generating location signals indicative of locations of the plurality of service vehicles, generating service signals indicative of waste services being performed by the plurality of service vehicles, and making determinations that the plurality of service vehicles have made a plurality of service stops based on the location and service signals. The method may also include automatically generating a plurality of service routes including the plurality of service stops; and displaying the plurality of service routes as geometric shapes encompassing, touching, or passing through electronic representations of the plurality of service stops on a map in at least one graphical user interface. The geometric shapes may have one of a size and a shape corresponding with a type of each of the plurality of service vehicles. The method may also include receiving drag & drop input from a user in association with the geometric shapes, and responsively organizing the plurality of service stops into at least one custom route.

DETAILED DESCRIPTION

Figure 1:
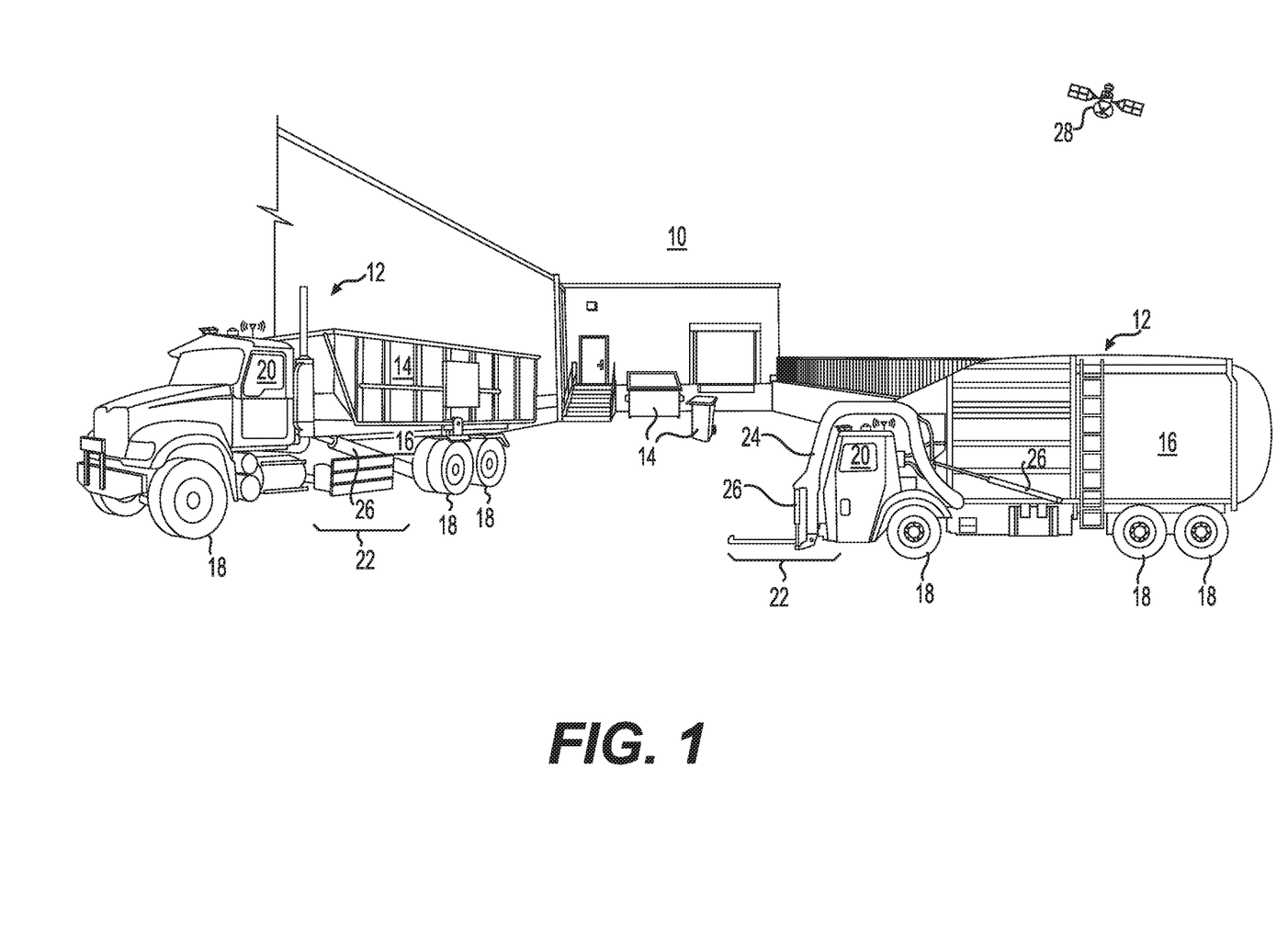
FIG. 1 is a perspective illustration of an exemplary disclosed waste management environment.

FIG. 1 illustrates an exemplary waste management environment ("environment") 10, at which one or more vehicles 12 are providing waste services. Environment 10 may include a retail store, a factory, a government building, a residential address, or another location having one or more receptacles 14 that require the service of vehicle(s) 12. The service may include, for example, the removal of waste materials from inside of receptacle(s) 14, the replacement of receptacle(s) 14, and/or the placement of new or additional receptacles 14.

Vehicle 12 may take many different forms. In the example shown on the right in FIG. 1, vehicle 12 is a hydraulically actuated, front-loading type of vehicle. Specifically, vehicle 12 may include a bed 16 supported by a plurality of wheels 18, a cab 20 located forward of bed 16, and a lifting device 22 extending forward of cab 20. Lifting device 22 may consist of, among other things, one or more lift arms 24 configured to engage and/or grasp receptacle 14, and one or more actuators 26 powered by pressurized oil to raise and tilt lift arms 24 (and receptacle 14) up past cab 20 to a dump location over bed 16. After dumping of receptacle 14, pressurized oil may be released from hydraulic actuator(s) 26 to allow lowering of lift arms 24 and receptacle 14 back to the ground in front of vehicle 12. In other examples, lifting device 22 may be located to pick up receptacles 14 from a side and/or a rear of vehicle 12. In yet other examples, receptacles 14 may be manually lifted and dumped into bed 16. In any of these examples, bed 16 could be outfitted with a compactor (not shown) to compact the waste material after the material is dumped into bed 16, and/or a door (not shown) configured to close an opening of bed 16 through which the waste material is dumped. Other configurations may also be possible.

In the example shown on the left in FIG. 1, vehicle 12 is a hydraulically actuated flatbed or roll-off type of vehicle. Specifically, vehicle 12 may include a bed 16 supported by a plurality of wheels 18, a cab 20 located forward of bed 16, and a lifting device 22 extending rearward of cab 20. Lifting device 22 may consist of, among other things, one or more actuators 26 powered by pressurized oil to raise and tilt receptacle 14 up onto bed 16 for transportation of receptacle 14 away from environment 10. After dumping of receptacle 14 at a disposal site (or swapping a full receptacle 14 for an empty receptacle 14), receptacle 14 may be returned to environment 10 and lowered back to the ground behind vehicle 12 (e.g., by releasing pressurized oil from hydraulic actuator(s) 26).

As each vehicle 12 moves about environment 10, a satellite 28 or other tracking device may communicate with an onboard controller 30 (shown only in FIG. 2) to monitor the movements of vehicle 12 and the associated changes made to environment 10 (e.g., pickup, dumping, placement, etc.). As will be explained in more detail below, onboard controller 30, or a separate offboard controller (e.g., a controller 32 located in a back office 34 or other service facility—shown only in FIG. 2), may then manage future operations of vehicle 12 (and other similar vehicles 12) based on these movements and changes.

Both of onboard and offboard controllers 30, 32 may include means for monitoring, recording, storing, indexing, processing, communicating, and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 2:
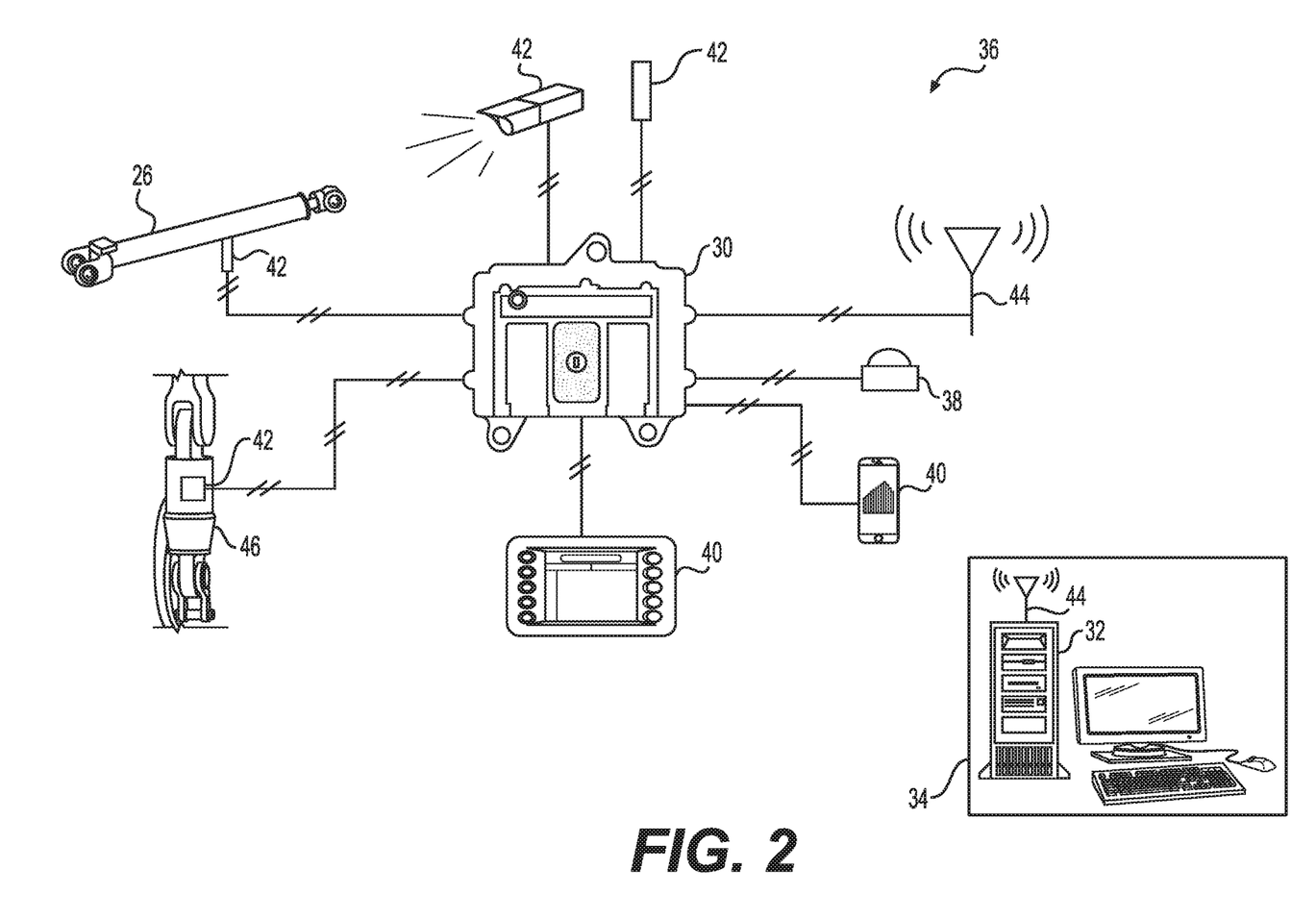
FIG. 2 is a diagrammatic illustration of an exemplary disclosed system that may be used to manage the environment of FIG. 1.

As shown in FIG. 2, onboard controller 30 may form a portion of a waste management system ("system") 36 that is configured to track, assist, and/or control movements of vehicle(s) 12 (shown only in FIG. 1). In addition to onboard controller 30, system 36 may also include a locating device 38, and at least one of a manual input device 40 and a sensor 42 mounted or otherwise located onboard each vehicle 12.

In some embodiments, system 36 includes both manual input device 40 and one or more sensors 42. In other embodiments, sensor 42 (and/or controller 30) may be internal to input device 40. Onboard controller 30 may be in communication with each of these other components and/or with offboard controller 32 at back office 34 (e.g., via a communication device 44), and configured to determine, based on signals from these components and based on other known information stored in memory, the location of each vehicle 12 and characteristics and locations of receptacles 14 being moved by and/or in a vicinity of each vehicle 12.

Locating device 38 may be configured to generate location signals indicative of a geographical position and/or orientation of vehicle 12 relative to a local reference point, a coordinate system associated with environment 10, a coordinate system associated with Earth, or any other type of 2-D or 3-D coordinate system. For example, locating device 38 may embody an electronic receiver configured to communicate with satellites 28 (referring to FIG. 1), or a local radio or laser transmitting system used to determine a relative geographical location of itself. Locating device 38 may receive and analyze high-frequency, low-power radio or laser signals from multiple locations to triangulate a relative 3-D geographical position and orientation. In some embodiments, locating device 38 may also be configured to determine a location and/or orientation of a particular part of vehicle 12, for example of lift arms 24 and/or actuators 26 (shown only in FIG. 1). Based on the signals generated by locating device 38 and based on known kinematics of vehicle 12, onboard controller 30 may be able to determine in real time the position, heading, travel speed, acceleration, and orientation of vehicle 12, lift arms 24, and/or actuators 26. This information may then be used by onboard and/or offboard controllers 30, 32 to update the locations and conditions of vehicles 12 and/or receptacles 14 in an electronic map or database of environment 10.

It is contemplated that locating device 38 may take another form, if desired. For example, locating device 38 could be or otherwise include an RFID reader configured to interact with an RFID tag located within environment 10 (e.g., at a customer location, on receptacle 14, etc.), or another type of scanner configured to read another type of indicia (e.g., a barcode) within environment 10. Based on the reading of the RFID tag or other indicia, the location and/or orientation of vehicle 12 (e.g., the location signals) may be linked to the known location of the RFID tag or other indicia within environment 10. It is also contemplated that a separate RFID or barcode reader could be included in system 36, if desired.

Input device 40 may provide a way for an operator of vehicle 12 to input information regarding observances made while traveling around environment 10. For example, the operator may be able to enter a type and/or condition of waste observed at a particular location, an amount of waste in or around receptacle 14, a fill status of a particular receptacle 14, a condition of receptacle 14, a location of receptacle 14, and or other information about the receptacle and waste engaged by, loaded into, or otherwise processed by vehicle 12. The information may be input in any number of ways, for example via a cab-mounted touch screen interface, via one or more buttons, via a keyboard, via speech recognition, via a mobile device (e.g., a smartphone or tablet) carried by the operator, or in another manner known in the art. In some embodiments, the operator may also be able to respond to inquiries received via input device 40, if desired. In addition to receiving manual input from an operator, input device 40 may also be capable of displaying information, for example the electronic map of environment 10, instructions from back office 34, route information, payload information (e.g., weight and/or volume), questions, etc.

In some embodiments, input device 40 may be configured to execute a waste management application. For example, when input device 40 is a mobile device (for example a smartphone, tablet, or watch), the application can be a mobile app ("app"). An app is an abbreviated term for a "software application", which is downloadable to (or otherwise installed within) and executable by a mobile device (e.g., a laptop, a smartphone, a tablet, an in-dash display, etc.). The disclosed waste management app can provide a graphical user interface (GUI) configured to display information about a waste service operation to the operator of vehicle 12; and that receives input from the operator used to configure acquisition of operational data by sensor(s) 42, to transmit the operational data to controllers 30, 32, to receive and display information about a current operation (e.g., as monitored by sensor(s) 42), etc.

Sensors 42 may be configured to monitor parameters associated with the waste material loaded into vehicle 12 and/or the associated receptacles 14 being moved by vehicle 12 (e.g., moved by lift arms 24), and to generate corresponding service signals indicative thereof. Each of these sensors 42 may be any type of device known in the art, and located anywhere on or in vehicle 12. In one example, sensor 42 is a lift sensor, such as any one or more of a load cell, a force gauge, a pressure sensor, a motion sensor, or another type of lift sensor associated directly with lift arms 24, with actuator(s) 26, with receptacle 14, and/or with a strut 46 supporting bed 16. In this example, the signals generated by sensor(s) 42 may correspond with strain on lift arms 24, with a force applied to lift arms 24 by actuator(s) 26, with a payload weight of bed 16, with a motion of receptacle 14, with a weight of waste contained inside receptacle 14, etc.

Alternatively, one or more sensors 42 may be associated with a power source or drivetrain of vehicle 12, and configured to generate signals indicative of an amount of power used to propel vehicle 12, to drive the hydraulics of actuators 26, to move the in-bed compactor, or to shut the associated door. Other types of sensors 42 (e.g., cameras, spectrometers, IR sensors, RADAR sensors, LIDAR sensors, etc.) may also be utilized to determine characteristics (e.g., load profile, volume, and/or shape) of the waste material inside receptacles 14 or of receptacles 14 themselves. In yet further examples, sensor 42 could be an acoustic sensor (e.g., one or more microphones), an accelerometer, or another similar type of sensor configured to detect engagement conditions and/or cycle completion of lift arms 24, the in-bed compactor, the door, etc. during lifting, dumping, and/or shaking of receptacle 14. Other types of sensors 42 may alternatively or additionally be utilized. Signals generated by these sensors 42 may be communicated to onboard and/or offboard controllers 30, 32, and the corresponding processing unit may use the signals to determine conditions surrounding receptacles 14 (and/or the waste inside receptacles 14) during servicing by vehicle 12. As described above, any one or more of sensors(s) 42 may form an integral portion of input device 40 (e.g., the smartphone or tablet carried by the operator) or be a standalone component in wired or wireless communication with controllers 30, 32 and/or input device 40, as desired.

Onboard controller 30 may be configured to manage communications between other onboard components and offboard controller 32 located at back office 34. For example, onboard controller 30 may receive signals from locating device 38, input device(s) 40, and sensor(s) 42, and correlate the signals, filter the signals, buffer the signals, record the signals, or otherwise condition the signals before directing the signals offboard via communication device 44.

Communication device 44 may be configured to facilitate communication between onboard controller 30 and offboard controller 32. Communication device 44 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, onboard controller 30 may be omitted, and offboard controller 32 may communicate directly with locating device 38, input device(s) 40, and/or sensor(s) 42 via communication device 44, if desired. Other means of communication may also be possible.

Onboard and/or offboard controllers 30, 32, based on the information received from onboard vehicles 12 and also based on information received from other sources (e.g., from the Internet, from input received at back office 34, etc.), can be configured to execute instructions stored on computer readable medium to perform methods of waste management at environment 10. For example, onboard and/or offboard controllers 30, 32 may be configured to monitor when vehicle 12 is slowing down at a potential or existing service location, when vehicle 12 has stopped, when vehicle 12 is performing a waste-related service (e.g., servicing receptacle 14 at a service stop), when vehicle 12 is filled with waste to a maximum capacity, etc. This monitoring may then be used to automatically generate a plurality of different service routes each having a plurality of different service stops. In addition, once the different service routes have been determined, the disclosed app may be exercised by a user to make route adjustments, to create custom routes, to assign the routes to a fleet of vehicle 12, to track business costs and efficiencies, etc.

Figure 3:
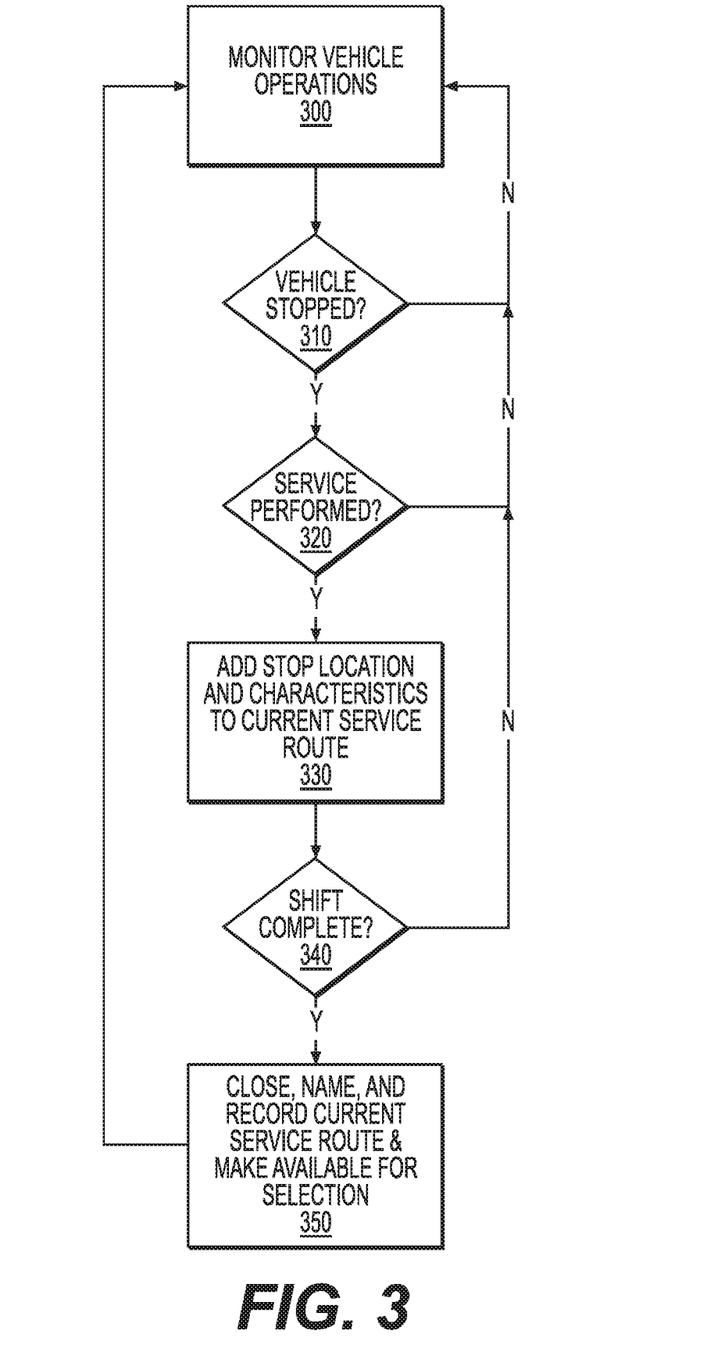
FIG. 3 is an exemplary disclosed method that may be completed by the system of FIG. 2.
Figure 4:
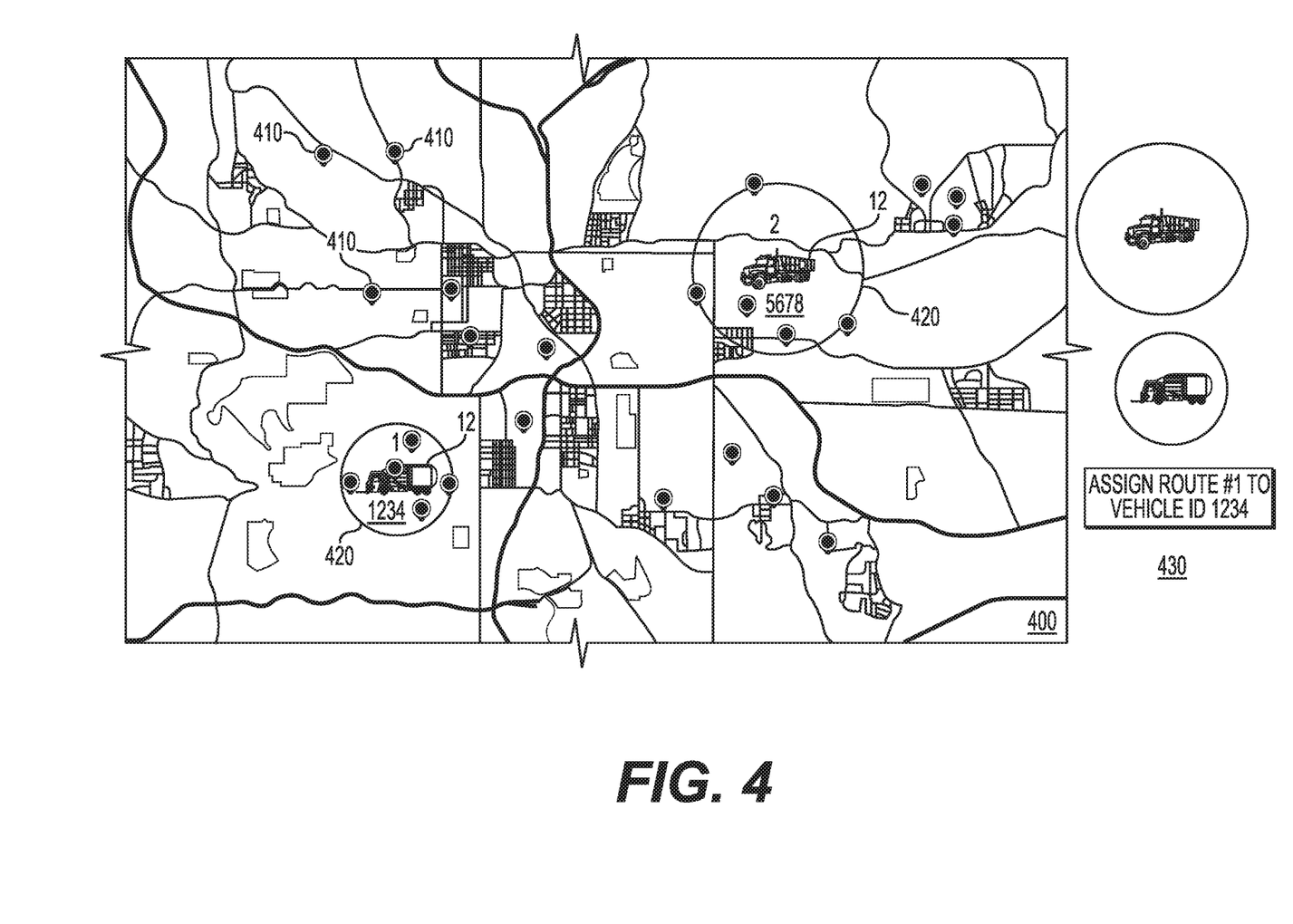
FIGS. 4 and 5 are diagrammatic illustrations of exemplary disclosed graphical user interfaces that may be used to access the system of FIG. 2.
Figure 5:
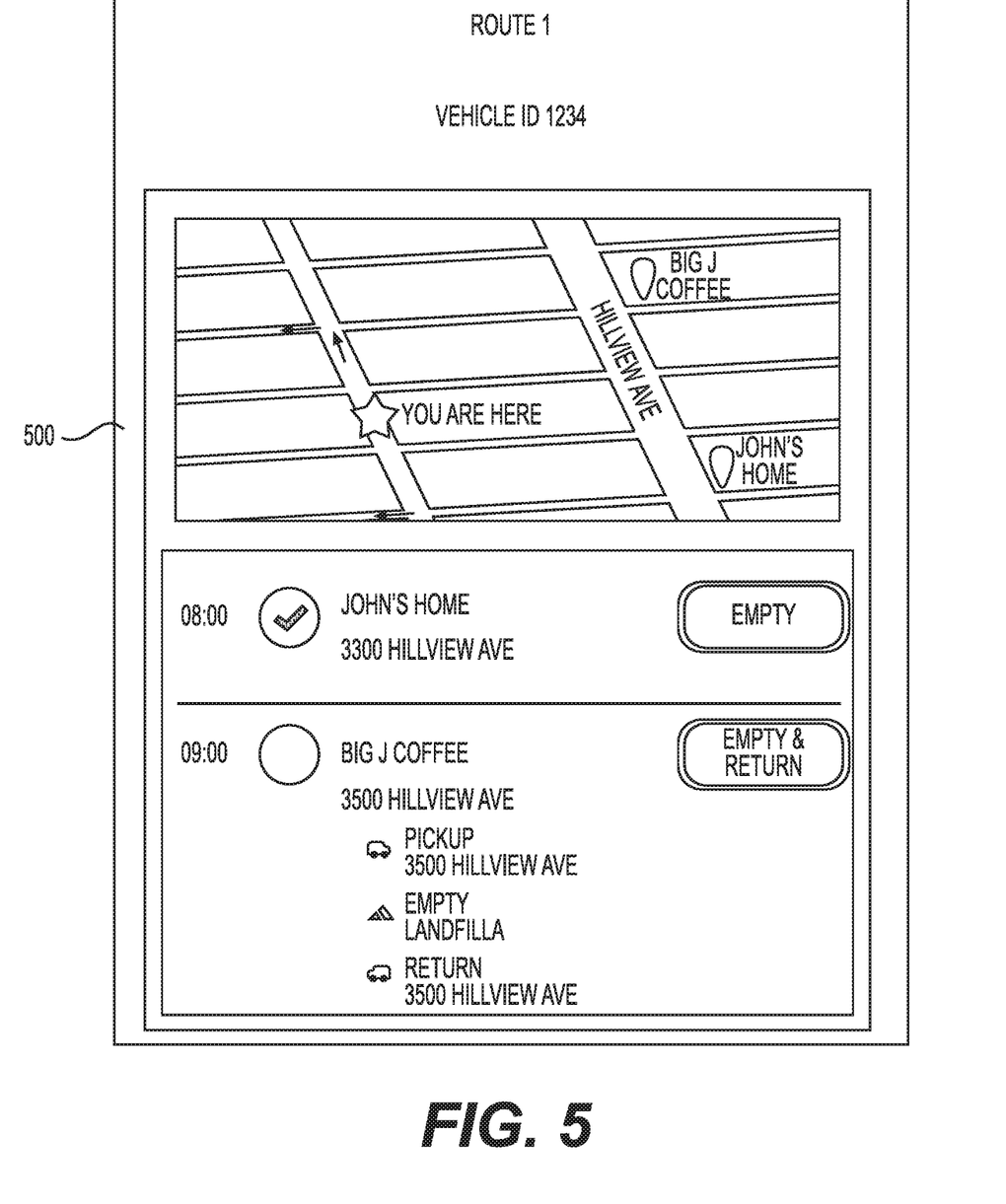

An exemplary process of waste service management that may be performed by onboard and/or offboard controllers 30, 32 is illustrated in FIG. 3 and will be explained in more detail in the following section to further illustrate the disclosed concepts. In addition, FIGS. 4 and 5 represent exemplary Graphical User Interfaces (GUIs) that may be shown in connection with the disclosed waste management app on any input device 40 for use by the operator of service vehicle 12 (and/or by a service manager at back office 34) to access system 36. FIGS. 4 & 5 will also be discussed in greater detail below to further illustrate the disclosed concepts.

INDUSTRIAL APPLICABILITY

The disclosed system, method, and app may be applicable to the waste service industry, where efficient management of waste services can affect profitability for a provider. The disclosed system, method, and app may provide a way for a service provider to automatically generate multiple different service routes. In addition, once the routes are generated, assignments, route additions, and/or route adjustments may be intuitive and simple to make. Operation of the disclosed system and app will now be described in detail with respect to FIGS. 3-5.

As seen in FIG. 3, the disclosed method may be implemented to automatically generate electronic representations of multiple different service routes within a common geographic region. In the disclosed embodiment, this process may be completed without requiring manual interaction from a service provider or vehicle operators that are in the provider's employ. Actual service routes being followed by the vehicle operators may already exist in an informal state for some service providers. However, these informal service routes may be precisely known to only the particular vehicle operators driving the routes. That is, the informal routes may not be automatically loaded into any type of automated system that can track completion and/or adjustments of the routes. In these situations, a change to an operator roster, a customer base, and/or the service needs of particular customers may be difficult to accommodate in an efficient and profitable manner. It is contemplated that some or all of the information associated with the existing customers and/or the informal routes could be manually loaded into the disclosed system (e.g., via back office 34), if desired. However, this manual information loading can be cumbersome, prone to error, and forever ongoing.

During performance of waste services by the various vehicles 12 within a service provider's fleet, onboard controller 30 and/or offboard controller 32 (e.g., at least one processing unit of at least one of these controllers) may monitor vehicle operations (Step 300). The vehicle operations may include, for example, travel of vehicle 12 (e.g., tracking of location, heading, speed, and/or acceleration), use of lifting device 22 (e.g., receptacle lifting, tilting, dumping, and associated force or weight changes), use of the in-bed compactor (if available), use of the bed door (if equipped), engagement and/or movement of receptacles 14, and/or other similar service related characteristics. These characteristics may be monitored via locating device 38, sensor(s) 42, and/or input device 40.

In some instances, the operations of vehicle 12 may be continuously monitored. In other instances, the operations may be monitored only at a particular time of day (e.g., during a typical work shift), only during particular days of the week (e.g., only during the typical work week), only after vehicle 12 has been turned on, only when input device 40 (e.g., the smartphone or tablet embodiment of input device 40) is placed within a threshold proximity to (e.g., inside of) vehicle 12, only when input device 40 is in communication with (e.g., has been paired with) the other components of system 36, etc. In the disclosed embodiment, initiation of service monitoring does not require input (e.g., login) from the operator. Instead, monitoring may be controlled via the disclosed app, which may always be running in a background of input device 40.

During monitoring of vehicular operations, the appropriate processing unit(s) may determine if any vehicle 12 has stopped (Step 310). This stop determination may be made based on an acceleration, location, and/or speed of vehicle 12, as provided by locating device 38. For example, when a speed of vehicle 12 drops below a threshold speed, vehicle 12 may be considered to have stopped. Until vehicle 12 stops, control may cycle through steps 300 and 310.

Once vehicle 12 has stopped (step 310:Y), the appropriate processing unit(s) may determine if services are performed by vehicle 12 at the stopped location (i.e., if the stopped location is a service stop—Step 320). This service determination may be made based on the signals generated by sensor(s) 42 and/or input device 40. For example, if a monitored movement of lifting device 22 corresponds with a minimum movement and/or force threshold, it can be concluded that a receptacle 14 was lifted, tilted, and/or dumped into bed 16. In another example, identification (e.g., image identification, RFID identification, etc.) of receptacle 14 and/or a detected vehicular proximity to receptacle 14 may be used to determine that a service has been completed.

Other ways to determine service completion may also be implemented. When any service-related actions follow and/or occur at the same time as a stop of vehicle 12 (e.g., within a threshold period of time of vehicle 12 stopping), the appropriate processing unit(s) may conclude that services have been performed at the current stop location and that the location of the stop (as well as characteristics of the services, such as receptacle id, size, weight, type, etc.) should be added to a current route of vehicle 12 (Step 330). For example, when a particular vehicle 12 (a front-loading vehicle having an identification number of 1234) is detected to have stopped at a particular address (e.g., at John's Home, address 3300 Hillview Ave) and that a particular receptacle 14 (e.g., a 2 yrd. dumpster) was serviced (e.g., lifted, tilted, dumped, and returned), that stop and the associated service parameters may be added to a listing of stops within the current route (e.g., route 1).

The process of determining and adding service stops to the current route may continue until the current route is complete. The appropriate processing unit(s) may determine that the current route is complete, for example, when a work shift for vehicle 12 and/or the operator has ended (Step 340. The work shift may be determined to have ended based on a particular time of day, when vehicle 12 returns to a base or disposal location, when vehicle 12 is turned off, when another operator begins use of vehicle 12, when vehicle 12 leaves a current geographic region (e.g., crosses a geofence), when input device 40 is no longer in close proximity to vehicle 12, based on operator input received via input device 40, and/or in response to another triggering condition. Until the work shift has ended, control may return from step 340 to step 300.

Once the work shift has ended (Step 340:Y), the appropriate processing unit(s) may closeout the current route (Step 350). This may be done, for example, by recording details of the current route (details of each service stop in the route) into memory, naming the route, and/or making the route available for manual selection and/or adjustment.

In some embodiments, details about each route stored in memory may be linked to the particular service vehicle 12, type of service vehicle 12, and/or operator that initially completed the route. For example, a particular route may be linked to a roll-off vehicle, a front-loading vehicle, a side-loading vehicle, and/or a rear-loading vehicle. In addition, the number, types, and/or sizes of receptacles 14 serviced in each route could be linked to a size and/or capacity of vehicle 12, a time required for each vehicle 12 to complete the route, a travel range of each vehicle, etc. In this manner, a relationship may be developed between each route and each type of vehicle 12, specific vehicle 12, and/or operator.

FIG. 4 shows an exemplary GUI 400, which may be used in connection with the method that is described above and shown in FIG. 3. GUI 400 may be shown on any input device 40 and/or at back office 34. Among other things, GUI 400 may be caused to display a map showing any number of different service stops for which a particular service provider is responsible, as well as any number of different routes of stops that should be serviced by a particular type and/or specific vehicle 12. The displayed stops and routes may be the same stops and routes detected and generated via the method of FIG. 3 described above, and/or other stops and routes that are generated via uploading of related information (e.g., stops that are added to a route based on proximity of vehicle 12, schedule, capacity, etc.). In some embodiments, the displayed stops and/or routes may dynamically change based on traffic data and operator input.

In the disclosed embodiment, each stop displayed in GUI 400 is represented by a flag 410, and each route is represented by a geometric shape (e.g., a circle, a polygon, a line, etc.) 420 that encompasses, touches, and/or passes through each stop in the same route. For example two routes (labeled as 1 and 2) are shown as circles 420 in FIG. 4, each circle 420 encompassing one or more stops shown as flags 410 (e.g., 4 and 5 stops, respectively). Each route is also shown in connection with a particular service vehicle 12. The particular service vehicle 12 displayed within each geometric shape 420 (e.g., at a general center of each circle 420) may be the same vehicle 12 monitored by the disclosed processing unit(s) during generation of the corresponding route. Alternatively, the vehicle 12 displayed in connection with a particular geometric shape 420 may be another vehicle 12 that is assigned by a user to complete the route next.

In addition to displaying already-generated stop and route information, GUI 400 may be used to create new or custom routes, to make route adjustments, and/or to assign routes and/or stops to particular vehicles 12. For example, a user may be able to assemble different service stops shown on GUI 400 into custom routes, which may or may not have existed before. For example, the user may be able to place the geometric shapes 420 described above (e.g., drag the shapes 420 from a corresponding menu bar 430) around any number of different flags 410 shown on GUI 400 to thereby create new and custom routes. In this example, the geometric shapes 420 may have a set size and/or configuration, or may have an adjustable size and/or configuration. In particular, the size and/or configuration of the geometric shape 420 (e.g., a diameter of the circle 420) may correspond with specifications of a particular vehicle 12 intended for completion of the corresponding route. The size and/or shape may be dependent on, among other things, a type, a size, a travel range, and/or a volume or weight capacity of the particular vehicle 12 chosen by the user to service the assembled route. For example, a roll-off type of vehicle 12 may be available for selection from menu bar 430 of GUI 400, and have a larger or smaller corresponding circle than a front-loading type of vehicle also available from menu bar 430 depending on specifications of each type of vehicle. In this way, when generating a custom route for completion by a particular vehicle 12, the size of the corresponding geometric shape 420 may allow the user to appropriately dispatch (e.g., to not over- or under-load) the right vehicle 12 (e.g., the vehicle having the required specifications) for the associated service stops. In some embodiments, additional characteristics of vehicles 12 may be shown in connection with their geometric shapes 420. These additional characteristics could include, for example, an indication of fill rate, anticipated fill level, amount of route completed, etc.

In some embodiments, the disclosed app may be configured to alert a user when the user has made an inappropriate selection or adjustment. For example, it may be possible for a user to select a first type of vehicle 12 (e.g., a front-loading vehicle) for use in servicing a stop that requires another vehicle configuration (a roll-off configuration). In this instance, when the user attempts to drag the corresponding geometric shape of the first type of vehicle over the stop, the app may generate an alert or otherwise prevent the action. For example, the flag corresponding to the stop may be highlighted or flash; a message may pop up; or the shape may simply be blocked from moving over the flag. In this instance, the user may become aware of the inappropriate selection or adjustment and have an opportunity to remedy the situation.

During and/or after generating a custom route (e.g., by dragging and dropping a corresponding shape 420 over a collection of flags 410) for a type of vehicle 12, the user may also be able to assign a particular vehicle 12 of that type to the route. For example, after defining route 1 as including the four stops shown in the lower left corner of the map of GUI 400, and after determining that a front-loading type of vehicle 12 should service route 1, the user may be able to assign route 1 to a particular front-loading type of vehicle 12 having an identification number 1234. This assignment may be made via GUI 400, for example via menu bar 430 already described above.

After the user has assigned a particular route containing a particular set of stops to a particular vehicle 12 having particular specifications, the route assignment may be communicated (e.g., via communication devices 44) to the operator (e.g., to input device 40) of that particular vehicle 12. This communication may trigger a different exemplary GUI 500 of FIG. 5 to be displayed on input device 40.

In the exemplary GUI 500 shown in FIG. 5, two of the four stops associated with route 1 are displayed. These stops include a first stop at John's Home and a second stop at Big J Coffee. It should be noted that each service route could include any number of stops. John's Home is shown as being located at 3300 Hillview Ave and has a scheduled service time of 8:00 am. Big J. Coffee is shown as being located at 3500 Hillview Ave and has a later scheduled service time of 9:00 am. The service to be completed at John's Home is simply to empty an existing receptacle 14 into bed 16 of vehicle 12; while the service to be completed at Big J Coffee is to pick up an existing receptacle 14, take the receptacle 14 to a particular land fill (i.e., to Landfill A), and then to return the empty receptacle 14 back to Big J Coffee. The details of these services may be the same as details recorded earlier when the same or another vehicle 12 completed route 1 while having its activities monitored via system 46 (as described in connection with the method of FIG. 3). Other services could also or alternatively be associated with each stop, as manually directed.

The services at John's Home are shown in GUI 500 as having been completed (e.g., with a checkmark). The completion of service at a particular stop in an assigned route may be confirmed manually and/or automatically, as desired. For example, upon completion of a particular service task at a particular location, the operator of vehicle 12 may provide manual input indicative of the completion to input device 40. This input could include, for example, pressing of a button, touching of a screen (e.g., touching the checkmark area shown in FIG. 4 at the left of "John's Home"), voicing an audible command, etc.

After confirmation is received that waste services at a particular stop in the assigned route have been completed, the map shown in GUI 500 may represent the relative location of vehicle 12 and a next stop in the route. That is, after completion of a service task at one stop, the disclosed app may cause the map to be automatically updated and correspond with the next stop. It is also contemplated that the operator may manually request the relative location associated with any particular stop to be shown in the map of GUI 500, if desired, regardless of the status of a particular service task.

The interfaces illustrated in FIGS. 4 and 5 are exemplary only and provided to highlight certain aspects of the disclosed system. Other views and functionality are contemplated, as would be understood by one of skill in the art. It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for managing waste services by a service vehicle, comprising:
   a locating device comprising an electronic receiver that communicates with at least one of: (i) satellites; (ii) local radio; and (iii) a laser transmitting system to determine a relative geographical location of the electronic receiver, the locating device configured to generate a location signal indicative of a location of the service vehicle;
   a sensor configured to generate a service signal indicative of a waste service being performed by the service vehicle;
   an input device; and
   a controller comprising a central processing unit in communication with the locating device, the sensor, and the input device, the central processing unit being configured to execute programming instructions that enable the controller to:
   make a determination that the service vehicle has made a plurality of service stops based on the location signal and service signal;
   dynamically adjust a geographic region that contains the plurality of service stops based on detected service vehicle locations with respect to one or more added or dropped service stops;
   display a particular service route as a geometric shape encompassing, touching, or passing through electronic representations of the plurality of service stops;
   receive drag & drop input from a user in association with the geometric shape;
   responsively organize the plurality of service stops into a custom route;
   receive a selection from a user regarding a desired type of service vehicle to complete the custom route;
   selectively adjust at least one of a size and shape of the geometric shape based on the selection; and
   automatically assign the custom route within the geographic region that contains the plurality of service stops, the custom route being assigned to the service vehicle and being assigned based on location data associated with the service vehicle, a type of a service vehicle, and one or more types of vehicle operations required at the plurality of service stops.

2. The system of claim 1, wherein the geometric shape is one of a circle, a polygon, and a line.

3. The system of claim 1, wherein the geometric shape has at least one of a size and a shape corresponding with a type of the service vehicle.

4. The system of claim 1, wherein the controller is further configured to:
   receive an identity assignment of a particular service vehicle to complete the custom route; and
   selectively communicate information regarding the custom route to the input device of the particular service vehicle based on the identity assignment.

5. The system of claim 4, wherein the controller is further configured to cause information to be displayed within at least one graphical user interface of the input device.

6. The system of claim 1, wherein:
   the service vehicle is one of a plurality of service vehicles, each separately equipped with the locating device and the sensor; and
   the custom route includes a plurality of custom routes, each associated with a different one of the plurality of service vehicles.

7. The system of claim 6, wherein the controller is configured to display the plurality of custom routes and the plurality of service stops on a map.

8. A method for managing waste services by a service vehicle, the method comprising:
   making a determination that the service vehicle has made a plurality of service stops based on a location signal indicative of a location of the service vehicle and a service signal indicative of a waste service being performed by the service vehicle;
   dynamically adjusting a geographic region that contains the plurality of service stops based on detected service vehicle locations with respect to one or more added or dropped service stops;
   displaying a particular service route as a geometric shape encompassing, touching, or passing through electronic representations of the plurality of service stops;
   receiving drag & drop input from a user in association with the geometric shape;
   responsively organizing the plurality of service stops into a custom route;
   receiving a selection from a user regarding a desired type of service vehicle to complete the custom route;
   selectively adjusting at least one of a size and shape of the geometric shape based on the selection; and
   automatically assigning the custom route within the geographic region that contains the plurality of service stops, the custom route being assigned to the service vehicle and being assigned based on location data associated with the service vehicle, a type of a service vehicle, and one or more types of vehicle operations required at the plurality of service stops.

9. The method of claim 8, wherein displaying the particular service route as the geometric shape includes displaying the particular service route as one of a circle, a polygon, and a line.

10. The method of claim 8, wherein displaying the particular service route as the geometric shape includes displaying the particular service route to have one of a size and a shape corresponding with a type of the service vehicle.

11. The method of claim 8, further including:
    receiving an identity assignment of a particular service vehicle to complete the custom route; and
    selectively communicating information regarding the custom route to the particular service vehicle based on the identity assignment.

12. The method of claim 8, wherein:
    the service vehicle is one of a plurality of service vehicles; and
    the method further includes automatically generating a plurality of custom routes, each associated with a different one of the plurality of service vehicles.

13. The method of claim 12, wherein displaying the particular service route and the plurality of service stops on a map includes displaying the plurality of custom routes and the plurality of stops on the map.

14. A non-transitory computer readable medium containing computer-executable programming instructions for performing a method for managing waste services by a plurality of service vehicles, the method comprising:

making determinations that the plurality of service vehicles have made a plurality of service stops based on a plurality of location signals indicative of locations of the plurality of service vehicles and a plurality of service signals indicative of waste services being performed by the plurality of service vehicles;

dynamically adjusting a geographic region that contains the plurality of service stops based on detected service vehicle locations with respect to one or more added or dropped service stops;

displaying a particular service route as a geometric shape encompassing, touching, or passing through electronic representations of the plurality of service stops;

receiving drag & drop input from a user in association with the geometric shape;

responsively organizing the plurality of service stops into a custom route;

receiving a selection from a user regarding a desired type of service vehicle to complete the custom route;

selectively adjusting at least one of a size and shape of the geometric shape based on the selection; and automatically assigning the custom route within the geographic region that contains the plurality of service stops, the custom route being assigned to a service vehicle of the plurality of service vehicles and being assigned based on location data associated with the service vehicle, a type of a service vehicle, and one or more types of vehicle operations required at the plurality of service stops.

* * * * *